United States Patent [19]

Kriete et al.

[11] Patent Number: 5,699,352
[45] Date of Patent: Dec. 16, 1997

[54] DISTRIBUTED TELECONFERENCING SYSTEM

[75] Inventors: Richard John Kriete, Hazlet; Robert B. Sussman, North Brunswick; Vladimir Zaltsman, Morris, all of N.J.

[73] Assignee: Lucent Technologies Inc., Murray Hill, N.J.

[21] Appl. No.: 522,040

[22] Filed: Aug. 31, 1995

[51] Int. Cl.[6] ................................................. H04M 3/56
[52] U.S. Cl. ..................................... 370/262; 379/203
[58] Field of Search ................................. 370/62, 110.1, 370/79, 60, 259, 260, 261, 262, 522; 379/158, 202, 203, 204, 205; 348/15

[56] References Cited

U.S. PATENT DOCUMENTS

| | | | |
|---|---|---|---|
| 3,544,726 | 12/1970 | Wimberly | 379/203 |
| 4,229,814 | 10/1980 | Betts | 370/62 |
| 4,342,111 | 7/1982 | Busson | 370/62 |
| 4,475,189 | 10/1984 | Herr et al. | 370/62 |
| 4,479,195 | 10/1984 | Herr et al. | |
| 4,529,842 | 7/1985 | Levy et al. | 370/62 |
| 4,611,095 | 9/1986 | LeBlanc et al. | |
| 4,691,347 | 9/1987 | Stanley et al. | |
| 4,796,293 | 1/1989 | Blinken et al. | 379/202 |
| 4,937,856 | 6/1990 | Natarajan | 379/202 |
| 5,113,431 | 5/1992 | Horn | 379/203 |
| 5,483,587 | 1/1996 | Hogan et al. | 379/202 |

OTHER PUBLICATIONS

AT&T, "AT&T Definity® Communications System", 1991 (2 pages).
AT&T, "The QUORUM® Teleconferencing Bridge", 1987 (2 pages).
Motorola Product Preview, Newron Chip Distributed Communication and Control Processor, pp. 1–3, 1991.

*Primary Examiner*—Douglas W. Olms
*Assistant Examiner*—Chau T. Nguyen

[57] ABSTRACT

A distributed teleconferencing bridge system is provided that allows an attendant to control multiple conferences on multiple bridges through a network interface unit. The attendant can add or delete conferees with a minimum of inconvenience to the conferees while maximizing the use of the bridges by setting up multiple conferences on multiple bridges from a single operating console. Multiple consoles allow multiple operators to control any number of conferences. The interface unit uses a Local Operating Network (LON) to reduce the number of physical wires to the network interface unit without sacrificing control or flexibility.

16 Claims, 2 Drawing Sheets

DISTRIBUTED TELECONFERENCING SYSTEM

BACKGROUND OF THE INVENTION

1. Field of the Invention

This invention relates to communication systems, and, more particularly, to controlling a telephone conference arrangement through a distributed control network.

2. Description of the Related Art

In a communication network, it is desirable to provide conference arrangements whereby many customers can be bridged together on a conference call. A conference bridge is a device which allows several telephone lines to be connected together to establish a telephone conference with negligible effect on transmission.

Typically, a dial-up conference arrangement is where each conferee is summoned at the appropriate time by establishing a communication path to the customer station. The customer is informed that he or she is wanted for a conference call and then added to the bridge where the customer can talk with the other conferees on the bridge. This type of an arrangement is under the control and supervision of an operator or attendant. The attendant can answer, add or disconnect individual conferees to the bridge with minimal interference to the other conferees connected.

In the prior art, only one attendant console was used to control one bridge. This restricted control of the bridge to those with physical access to the console, which therefore restricted the use of the bridge to one group of people. If multiple bridges were present at one site, a separate console needed to be dedicated for each bridge. A need therefore exists to be able to use an attendant console to control more than one bridge, or to have multiple consoles control a single bridge, without overly increasing the number of wires or overall complexity of the system.

SUMMARY OF THE INVENTION

In accordance with the principles of the present invention, a distributed teleconferencing system is provided. This system allows multiple bridges to be linked together where one or more attendants can control one or more bridges by the use of multiple attendant consoles. All the bridges and consoles are attached to a twisted pair distributed control network, allowing any console to control any bridge. This gives access to all teleconferencing resources to any operator with an attendant console. This further allows administration of a conference on one teleconferencing bridge to be shared between multiple operators.

BRIEF DESCRIPTION OF THE DRAWINGS

The features of the subject invention will become more readily apparent and may be better understood by referring to the following detailed description of an illustrative embodiment of the present invention, taken in conjunction with the accompanying drawings, where.

DETAILED DESCRIPTION OF PREFERRED EMBODIMENTS

Figure 1:
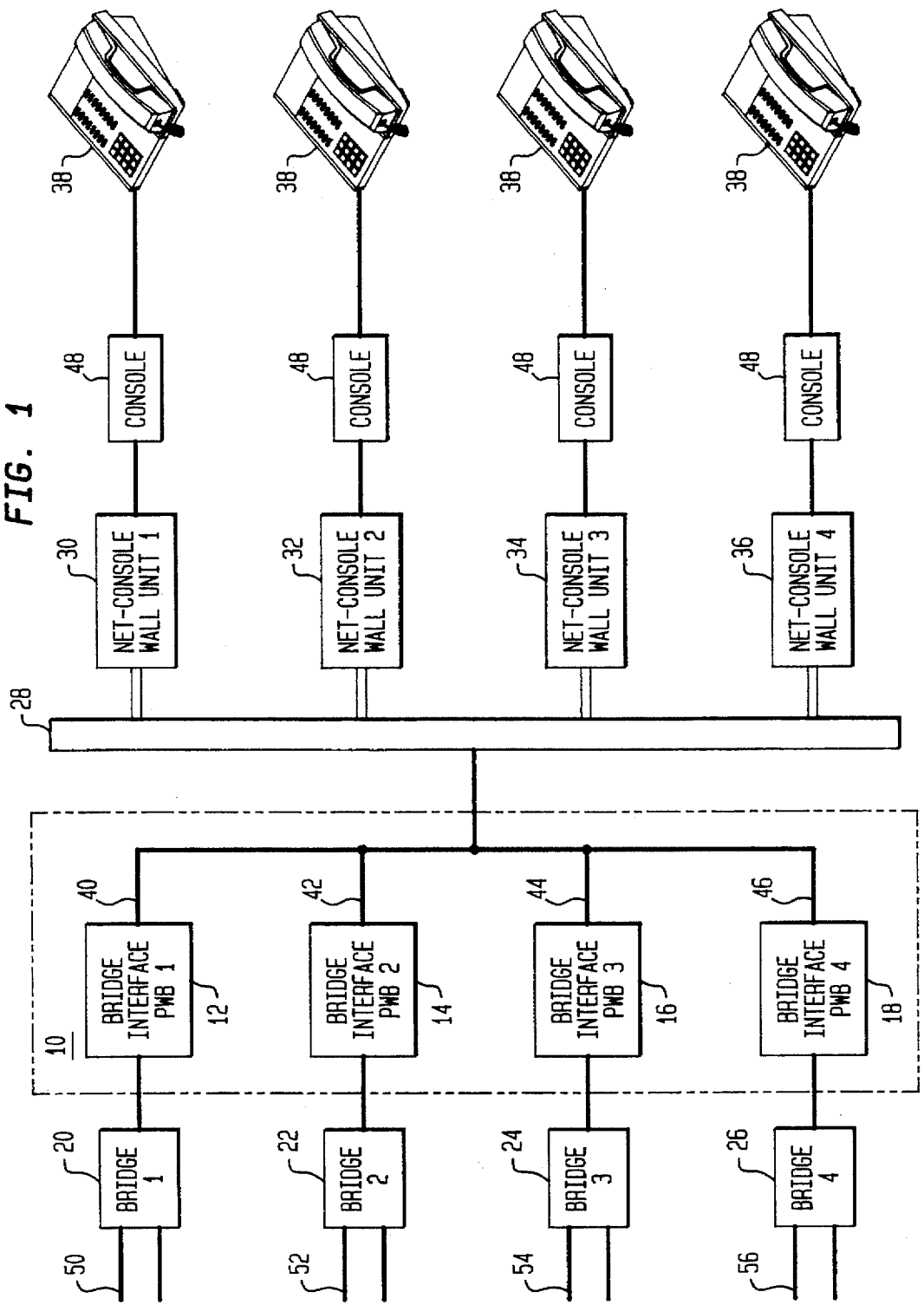
FIG. 1 shows a block diagram of a networked bridge of the present invention.

FIG. 1 illustrates, in a block diagram, the general organization of a system employing the present invention. In this embodiment, four bridges, 20, 22, 24 and 26 are interfaced together to form a single multi-configurable bridge network. Each of the individual bridges are connected to a network bridge interface unit 10.

Local Area Networks (LAN) allow computers and systems to communicate with one another through an assortment of communications media using standard protocol. A similar type of network is a Local Operating Network (LON). LANs are designed to move data whereas LONs are designed to move sense and control messages. These messages are typically very short and which contain commands and status information that triggers actions. In this way, LON technology offers a powerful means for implementing distributive systems such as teleconference bridges, that perform sensing, monitoring and control. By using LON technology in the interface unit 10, only control wires to and from each bridge interface are needed, versus multiple wires from each console on each bridge. The connections 40, 42, 44 and 46 are twisted pairs of wires. A typical bridge has up to twenty-eight ports 50, 52, 54 and 56 for up to 28 conferees on any one conference. The network bridge interface unit 10 translates control information from a 50-wire connection to each teleconferencing bridge to the two wire connection to the distributed control network 28. Messages are sent on the network between bridges and consoles using, for example, Echelon's LonTalk™ protocol on Motorola 3150 Neuron Chips. Without the use of network technology, 50 wires would be needed in the prior art from each bridge to each console. With the four bridges, 200 wires would have to be brought to each console. The distributed control network reduces this down to a single, twisted pair bus.

Within the network bridge interface unit 10 are multiple network-bridge interface printed wiring boards 12, 14, 16 and 18. These contain the LON technology and interfacing circuitry necessary for the bridges to interface with the control network. In the preferred embodiment, there are four bridges interfaced to the control network, all co-located in a single bay, but there could be more or less depending on the need for conferencing resources. The network can alternatively, be distributed throughout a building instead of in the same bay. In this embodiment, there are four attendants controlling the system, but there could be more or less depending on the typical number of conferences being handled. The greater the number of conferences, the more attendants and consoles are needed to control them.

Each attendant has a console 48. These consoles are used to set up conferences on any one of the bridges. Each console 48 has circuitry for interfacing to the control network. The consoles are used to set up and administer conferences on any one of the bridges 20, 22, 24 or 26. Each console has a telephone set 38 attached to it allowing the operator to place a call on any port on any bridge to add a conferee to a conference. The console is also used to delete conferees from a conference as well as to monitor conference quality via the attached telephone set 38. The control network allows any console 48 to control any bridge, thus allowing one operator to control all bridges or several operators to control the bridges separately. The consoles 48 are plugged into network consoles wall units 30, 32, 34 and 36. These units can be placed anywhere in a building, for example, giving the operator added flexibility.

In the preferred embodiment, each bridge has four groups of seven ports each. This allows the operator to connect up to four separate conferences with each bridge. The groups themselves are connectable, allowing conferences of up to 14, 21 or 28 conferees at any one time. In an alternate embodiment, each bridge dynamically allocates the number of ports needed for any particular conference, up to the maximum number of ports associated with that bridge. This allows not only a variable number of conferees on any particular bridge, but a variable number of conferences on each bridge. For example, if there are 28 ports on the bridge, there can be anywhere from 1 to 14 separate conferences.

In a further embodiment of the present invention, the networked bridges can dynamically allocate ports throughout the entire network. Thus, for example, if there are four bridges with 28 ports each, there can be anywhere from 1 to 56 conferences being held at any one time. The total number of conferees could range from 2 to 112 on any one conference. The operator console would have the ability to tie the bridges together allowing the conference to cross bridge boundary lines.

Figure 2:
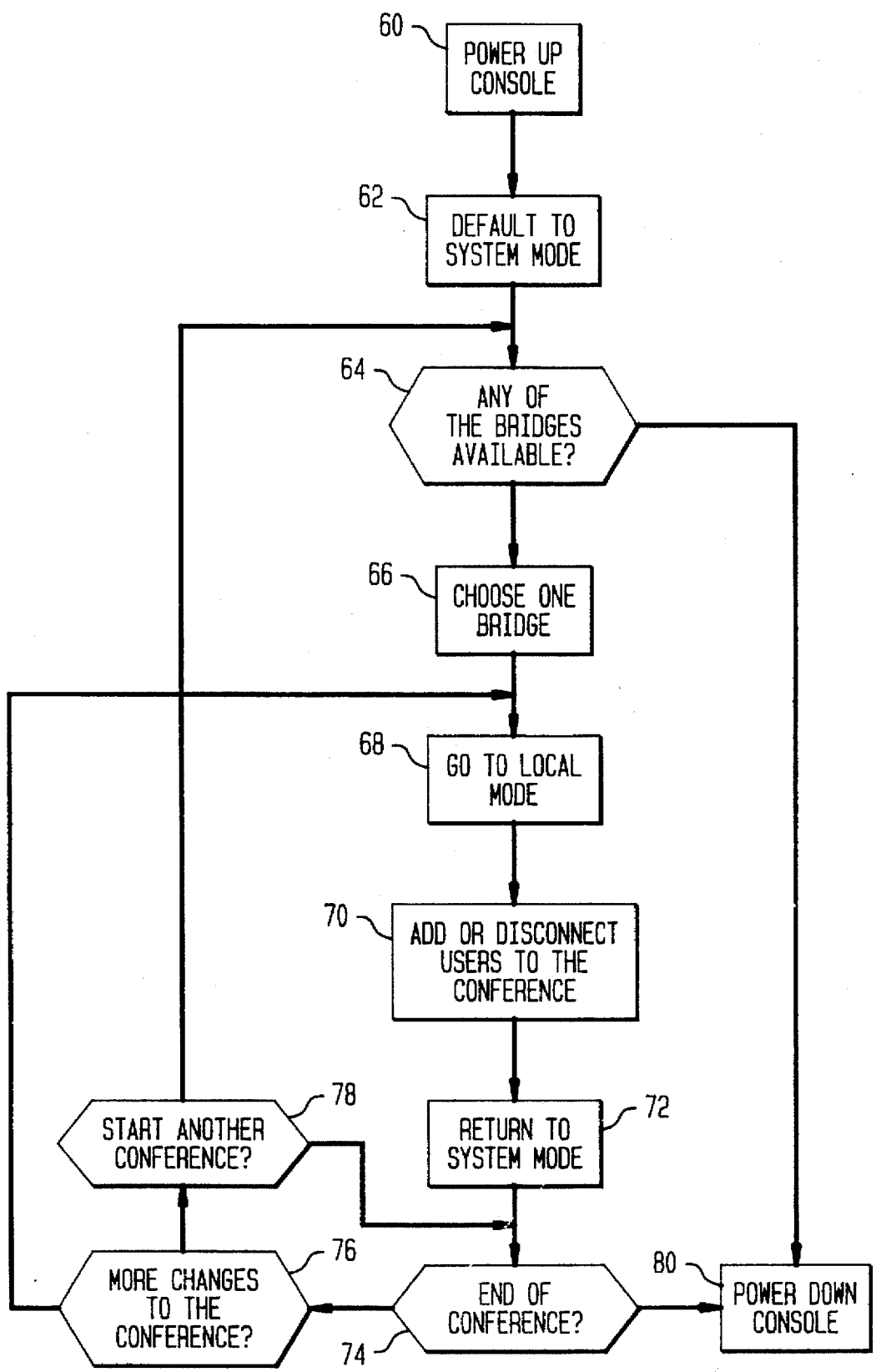
FIG. 2 illustrates a flow diagram of the operator interface of the present invention.

Depicted in FIG. 2 are the basic steps that the attendant goes through to operate a typical console of the preferred embodiment for a conference. Initially the console is powered up 60 in order to connect to the bridge. The console then automatically defaults to system mode 62. There are a series of lights on the console, each representing a bridge that is networked to the system. When the light is green, that bridge is available for use. A red light indicates that another operator is currently using that bridge. The operator determines if any of the bridge are available or partially available 64 and chooses that bridge 66. Otherwise, all bridges are in use and the operator will power down the console 80 and inform the person requesting the conference to try again at a later time.

Once the attendant chooses a bridge, he switches the system to local mode 68 for that particular bridge. This will tell the operator what groups are still available for that bridge. The attendant then proceeds to connect the conferees to the bridge and conference their calls together 70. After all the conferees are properly connected, the operator returns the console to system mode 72 for further conferencing.

If this is not the end of the conference 74, the operator notes if there are any changes to the make-up of the conference 76 or, if another conference needs to be initiated 78. To change the make up of an ongoing conference, the operator sets the console back into local mode 68, makes the appropriate changes 70, and returns to system mode 72 when all the changes are complete. This allows the operator to make changes to any of the conferences on any of the bridges being used through the network bridge interface unit. With the use of the console, the attendant can alternate between the various conferences on the various bridges to make the requested changes.

At any time while one conference is taking place, a user may request a second conference to be initiated 78. The attendant need only to ascertain which, if any, of the bridges are still available 64. The identical procedures are then followed to set up the second conference as was done for the first conference.

When all conferences have been completed and all the conferees have been disconnected, the operator then powers down the console 80 until a user requests a new conference to be initiated.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A distributed teleconferencing bridge system comprising:

a plurality of voice teleconferencing bridges each having a plurality of ports connectable to a corresponding plurality of telephone line terminals;

at least one operator console controlling said plurality of voice teleconferencing bridges; and a bridge interface unit integrally connecting said plurality of voice teleconferencing bridges with said at least one console, said bridge interface unit networking each of said plurality of voice teleconferencing bridges to each of said at least one console using a local operating network (LON) protocol, wherein a number of transmission lines interfacing each said console to said bridge interface unit is substantially less than the number of telephone line terminals capable of participating in a teleconference via said bridges.

2. The system of claim 1 wherein each of said at least one console further comprises a telephone handset.

3. The system of claim 1 wherein each of said at least one operator console further comprises a means for establishing multiple conferences, with a selectable set of said plurality of ports being used for each conference.

4. The system of claim 3 wherein said means for conferencing includes adding or deleting at least one of said plurality of ports from any of said selectable sets of ports.

5. The system of claim 1 wherein said bridge interface unit further comprises a plurality of network bridge interface circuit cards, each of said interface circuit cards controlling a respective one of said plurality of voice teleconferencing bridges.

6. The system of claim 1 wherein each of said at least one operator console being able to interface a first of said plurality of voice teleconferencing bridges with a second of said plurality of said voice teleconferencing bridges.

7. The system of claim 1 wherein said number of transmission lines interfacing each said console comprises a single two-wire transmission line.

8. A distributed teleconferencing bridge system comprising:

at least one voice teleconferencing bridge having a plurality of ports connectable to a corresponding plurality of telephone line terminals;

a plurality of operator consoles controlling said at least one voice teleconferencing bridge with each of said operator consoles being connected to said bridge interface unit via a number of transmission lines substantially less than said plurality of bridge ports; and a bridge interface unit integrally connecting said at least one voice teleconferencing bridge with said plurality of consoles networking each of said at least one voice teleconferencing bridge to each of said plurality of consoles using a local operating network (LON) protocol.

9. The system of claim 8 wherein each of said plurality of operator consoles further comprises a telephone handset.

10. The system of claim 8 wherein said bridge interface unit further comprises at least one network bridge interface circuit card, each of said at least one interface circuit card controlling a respective one of said at least one voice teleconferencing bridge.

11. The system of claim 8 wherein said number of transmission lines connecting each said console with said bridge interface unit comprises a single two-wire transmission line.

12. The system of claim 8 wherein said at least one voice teleconferencing bridge comprises a plurality of voice teleconferencing bridges and further wherein each of said plurality of operator consoles being capable of setting up and administering a single conference on any one or plural of said bridges, each said console further capable of setting up and administering multiple conferences on any one or plural of said bridges.

13. A method of distributing a teleconferencing system comprising the steps of:

interfacing a plurality of telephone line terminals to a plurality of ports of a plurality of voice teleconferencing bridges;

networking said plurality of voice teleconferencing bridges together in a bridge interface unit, said networking being based on a local operating network (LON) protocol; and controlling said plurality of voice teleconferencing bridges with at least one operator console, with each of said at least one operator console being interfaced to said bridge interface unit via a number of transmission lines substantially less than said plurality of ports of said teleconferencing bridges.

14. The method of claim 13 wherein the step of controlling includes adding or deleting at least one of said plurality of telephone line terminals to said teleconferencing bridge.

15. The method of claim 13 wherein said number of transmission lines interfacing each said operator console comprises a single two-wire transmission line.

16. The method of claim 13 wherein said at least one operator console comprises a plurality of operator consoles, and said step of controlling comprises controlling, with any one of said consoles, multiple conferences on any one or plural of said said bridges.

* * * * *